United States Patent [19]
Kimura et al.

[11] Patent Number: 5,102,922
[45] Date of Patent: Apr. 7, 1992

[54] FOAMABLE COMPOSITION AND PROCESS FOR PREPARING THE SAME AND RIGID FOAMED ARTICLE AND PROCESS FOR PREPARING THE SAME

[75] Inventors: Yoshihiro Kimura, Osaka; Toshiaki Inoue, Settsu; Yuji Hiratsuka, Osaka, all of Japan

[73] Assignee: Kanegafuchi Kagaku Kogyo Kabushiki Kaisha, Osaka, Japan

[21] Appl. No.: 445,058

[22] Filed: Dec. 4, 1989

Related U.S. Application Data
[63] Continuation of PCT/JP89/00362, Apr. 4, 1989.

[30] Foreign Application Priority Data
| | | |
|---|---|---|
| Apr. 5, 1988 [JP] | Japan | 63-83581 |
| May 31, 1988 [JP] | Japan | 63-135224 |
| Jun. 14, 1988 [JP] | Japan | 63-146245 |
| Dec. 28, 1988 [JP] | Japan | 63-335144 |
| Feb. 23, 1989 [JP] | Japan | 1-44512 |

[51] Int. Cl.$^5$ ............................................ C08F 14/06
[52] U.S. Cl. .................................................. 521/145
[58] Field of Search ........................................ 521/145

[56] References Cited
U.S. PATENT DOCUMENTS
| | | | |
|---|---|---|---|
| 3,983,295 | 9/1976 | Muser et al. | 521/75 |
| 4,039,486 | 8/1977 | van der Marks | 521/145 |
| 4,042,556 | 8/1977 | Yoshinaga | 521/145 |
| 4,425,442 | 1/1984 | Sato et al. | 521/145 |
| 4,783,294 | 11/1988 | Kimura | 264/45.3 |
| 4,783,294 | 11/1988 | Kimura et al. | 264/53 |

FOREIGN PATENT DOCUMENTS
| | | |
|---|---|---|
| 259611 | 3/1988 | European Pat. Off. . |
| 62-41972 | 9/1987 | Japan . |
| 606097 | 8/1948 | United Kingdom . |

OTHER PUBLICATIONS
Derwent Abstract, No. 85:321598 [51], of JP-A 60-226466, Nov. 11, 1985 (Hayashi).
Chemical Abstracts, vol. 85, 1976, p. 59, Abs. No. 6780f, Columbus, Ohio, U.S., of JP-A 76 28163, Sep. 3, 1976 (Fujimori Tokozo).
Derwent Abstract, No. 85:021085 [04], of JP-A 59 215331, Dec. 5, 1985 (Fuji).
Derwent Abstract, No. 76:30756X [17], of JP-A 51 028163, Mar. 10, 1976 (Fujimori).
Search Report from PCT Int'l Appln. No. PCT/JP89/00362.

*Primary Examiner*—John Kight, III
*Assistant Examiner*—John M. Cooney, Jr.
*Attorney, Agent, or Firm*—Armstrong, Nikaido, Marmelstein, Kubovcik & Murray

[57] ABSTRACT

There are disclosed a foamable composition which comprises (A) a vinyl chloride resin, (B) an inorganic substance containing inorganic fibers of not less that 1 $\mu$m diameter, (C) a solvent having properties such that when a mixture, which is composed of 100 parts by weight of a vinyl chloride resin of average polymerization degree of 2400, 100 parts by weight of the solvent, and 6 parts by weight of dibasic lead stearate, is kneaded using a plastograph at 30 rpm while raising the temperature it exhibits a maximum torque of 4 to 25 N.m on the kneader, and (D) a decomposition-type blowing agent; and a process for preparing such; a rigid, foamed article made therefrom; and a process for preparing such article. Since the rigid, foamed article of the invention does not contain asbestos, it is not injurious to human safety and health. It has very low amounts of emitted heat, smoke, and noxious gas on burning; is deformed only a very small amount on burning; is excellent in dimensional stability and heat resistance in use at high temperatures; causes little turning to white ash even on forced burning, and is of low cost.

26 Claims, No Drawings

FOAMABLE COMPOSITION AND PROCESS FOR PREPARING THE SAME AND RIGID FOAMED ARTICLE AND PROCESS FOR PREPARING THE SAME

This application is a continuation application of International application No. PCT/JP89/00362 filed Apr. 4, 1989.

TECHNICAL FIELD

The present invention relates to a foamable composition and a process for preparing such, as well as to a rigid foamed article and a process for preparing such. More particularly, the present invention relates to a foamable composition which gives a rigid, foamed article which is excellent in its heat resistant properties and human safety and health (that is, it generates little heat, little smoke and little noxious gas on burning, is low in its heat deforming ratio on burning, and exhibits a high dimensional stability and a high form retentivity when used at high temperatures), and a process for preparing such. It further relates to the rigid, foamed article and a process for preparing such.

BACKGROUND ART

Foamed articles of polyvinyl chloride containing inorganic materials (hereinafter referred to as PVC) and processes for preparing such, have been disclosed for example, in Japanese Examined Patent Publications Nos. 26776/1977 and 7944/1978, and Japanese Unexamined Patent Publications Nos. 264232/1985 and 278543/1986.

In techniques disclosed in these publications, asbestos fibers have been incorporated into the foam as means to lessen its deforming ratin on burning, to improve its dimensional stability when used at high temperatures, and to increase its mechanical strength. Since the single fibers of asbestos are fine (diameter 0.03 to 0.01 $\mu$m or so) and flexible, it is relatively easy to uniformly distribute them in cell membranes (thickness 1 to 100 $\mu$m or so usually) of the foam.

In recent years, however, as the human harmfulness (carcinogenicity) of asbestos fiber has attracted considerable attention, regulation of its use also has been discussed. It is said that asbestos is harmful to health since its fibers are very fine and are easily inhaled and accumulated in pulmonary alveoli.

Therefore technology to incorporate reinforcing fibers, other than asbestos, into the foam, and such a foamed article product have been eagerly awaited. No other inorganic fiber, which is as fine and flexible as asbestos, actually exists. For example, the diameters of a single fiber of glass, rock wool, and ceramics are 10 to 13 $\mu$m, 4 to 6 $\mu$m, and 2 to 3 $\mu$m, respectively. Thus, they are thicker and more rigid than single asbestos fibers. Such a thick and rigid fiber is apt to break through a cell membrane of the foam so that the gas therein which creates the foam may escape. For this reason, it has been through, so far, that it is technically difficult to prepare a good foamed article by incorporating a significant amount of inorganic fibers, other than asbestos, into it, and that is is further difficult to secure by such a means a good, low density foamed article which would satisfy requirements of low cost, high thermal insulation and light weight.

Meanwhile, the present inventors have developed a foamed article of chlorinated vinyl chloride resin contained inorganic material (Japanese Unexamined Patent Publication No. 264645/1988). This has advantageous characteristics in that it does not have undesirable shrinkage even in case of exposure to high temperature due to fire, and it generates little heat and little smoke compared to the amount of heat and smoke inherent in such thermoplastic resins which have high chlorine contents. Furthermore, it has a dimensional retention of not less than 70% when heated for 1 hour and an expansion ratio of not less than 5 times when heated for 1 hour at 200° C.

However, the above-mentioned foamed article, based on the above-mentioned chlorinated vinyl chloride resin, has a tendency that, when it is forcedly burned (for example, in the surface test of JIS A1321), its resin parts are turned to ash, making its form retention difficult, and sometime causing generation of penetrating canals and collapse of its structure. The inventors have found that incorporating phosphoric ester is a means of alleviating such problems at least to some extent. However, they also recognized that efforts to prevent the material from turning to ash, for the purpose of surely preventing the collapse of the foam, are naturally limited under the very severe conditions of forced combustion (for example, of the model box test according to Notice No. 1231 of the Ministry of Construction (Japan)), where a flame extendibility and a flame spreading speed are used to simulate an actual fire in a closed chamber. In addition, because of the relatively high costs of chlorinated vinyl chloride resin itself and phosphoric ester, foamed articles made therefrom are also rather expensive. So there is still a need for an economically advantageous foam.

Then taking a lesson from the state of the prior art, the inventors repeated earlier studies. As a result, they found that they were able to obtain a new, low density, very good foamed article by using a combination of an inorganic substance, which contains inorganic fibers other than asbestos which are excellent with respect to their human safety and health, with a specific solvent. Surprisingly, in this new foamed article, the inorganic fiber does not break through the cell membrane of the foam, and so the blowing gas does not escape. In addition, the foamed article generates little heat, little smoke, and little noxious gas on burning, has a low heat deforming ratio on burning, is excellent in its dimensional stability and heat resistance when used at high temperatures, does not collapse due to turning to ash, and is low in cost. Thus, the present invention was attained.

Furthermore, selection of preferable conditions in the present invention made it possible to secure a foamed article which meets requirements of quasi-noncombustibility or noncombustibility specified in the Building Standard Law (Japan).

DISCLOSURE OF THE INVENTION

First, the present invention relates to a foamable composition which comprises (A) PVC, (B) an inorganic substance containing inorganic fibers of not less than 1 $\mu$m diameter, (C) a solvent which, when combined with 100 parts by weight of PVC of average polymerization degree of 2400, and 6 parts by weight of dibasic lead stearate per 100 parts by weight of solvent, and kneaded using a plastograph at 30 rpm while raising the temperature, causes the mixer to show a torque of 4 to 25 N.m; and (D) a decomposition-type blowing agent.

Secondly, the present invention relates to a process for preparing a foamable composition, characterized by kneading (A) PVC, (B) an inorganic substance containing inorganic fibers of not less than 1 μm diameter, (C) a solvent as defined above, and (D) a decomposition-type blowing agent, at a temperature not less than that at which the PVC and the solvent become compatible with each other which is not more than the boiling point of the solvent.

Thirdly, the present invention relates to a process for preparing a foamable composition, characterized by kneading (A) PVC, (B) an inorganic substance containing inorganic fibers of not less than 1 μm diameter and (C) a solvent as defined above at a temperature not less than that at which the PVC and the solvent become compatible with each other, and not more than the boiling point of the solvent; adding (D) a decomposition-type blowing agent to the mixture at a temperature lower than the decomposing point of the decomposition-type blowing agent; and further kneading the resulting mixture.

Fourthly, the present invention relates to a foamed article of expansion ratio of not less than 50 times which is prepared by expanding a foamable composition which is composed of (A) PVC, (B) an inorganic substance containing inorganic fibers of not less than 1 μm diameter, (C) a solvent as defined above, and (D) a decomposition-type blowing agent.

Fifthly, the present invention relates to a process for preparing a rigid, foamed article, characterized by kneading (A) PVC, (B) an inorganic substance containing inorganic fibers of not less than 1 μm diameter, (C) a solvent as defined above, and (D) a decomposition-type blowing agent; introducing the resulting composition into a closable mold; heating it under pressure to an appropriate expansion temperature to decompose the decomposition-type blowing agent; and then expanding the composition within the mold for a time sufficient to form said foamed article; and then opening the mold to recover the foamed, shaped article.

BEST MODE FOR CARRYING OUT THE INVENTION

The present invention is based on the fact that inorganic fibers are uniformly dispersed in the foam and so problems of conventional arts mentioned above are resolved when (A) PVC, (B) an inorganic substance containing inorganic fibers of not less than 1 μm diameter (hereinafter sometimes referred to merely as "inorganic fibers"), (C) a specific solvent, and (D) a decomposition-type blowing agent are mixed together, and the mixture is kneaded at a temperature higher than that at which the solvent becomes compatible with the PVC.

A well foamed PVC article containing inorganic fibers other than asbestos, or a quasi-noncombustive or noncombustive PVC foamed article has been produced by the practice of present invention for the first time, and has been made possible by skillfully taking advantage of the solubility (compatibility) between PVC and a solvent.

Conventionally, regardless of the type of PVC, dispersion or suspension, it had been impossible to obtain a foam containing thicker fibers such as rock wool and glass fibers which did not puncture the foam cells. The present invention made it possible to obtain a foam for the first time by using a specific solvent, compatible with PVC, regardless of the type of PVC. For example, use of a suspension type of PVC had previously been restricted since it had usually been difficult to microdisperse with the mere use of a kneader because of the large size of the polymer particles. According to the present invention, the use of a specific solvent, compatible with PVC, disentangles domain particles and microdomain particles in suspension-type PVC to a molecular order, and further forms a uniform gel phase from PVC and the solvent. Because the viscosity of the foamable composition usually rises on kneading and the shear force acting on a mass of inorganic fibers thus increases, the mass of inorganic fibers are disentangled. Then, the fibers become uniformly dispersed in the foamable composition, and the uniform gel phase envelopes and enwraps the inorganic fibers. Consequently, it becomes possible to uniformly distribute inorganic fibers in cell membranes of the foam. As a result, the inorganic fibers do not break through the cell members, and the percentage of closed cells in the foam increases, wherefor only small amounts of the blowing gas leak out. In addition, the formation of a homogeneous gel phase makes the proportion of the resin parts larger compared with the case of the absence of the solvent, and the resin parts uniformly envelope and enwrap the inorganic fibers so that a good foam may be formed.

In addition, by wetting the surface of the inorganic fiber with the solvent, air and water attached on the surface of the inorganic fiber migrate into the solvent, or are removed. This makes the contact between the surface of the inorganic fiber and the homogeneous gel phase stronger.

Furthermore, although the volume of the resin part decreases with evaporation of the solvent after blowing, its proportion relative to the inorganic fibers does not change. Thus, the inorganic fibers remain completely covered with the PVC film.

Accordingly to the present invention, the use of a specific solvent, compatible with PVC, disentangles domain particles and microdomain particles down to a molecular order of PVC, and makes granularity and porosity of PVC particles disappear. For this reason, the gas retentivity of cell membranes of the foam is improved and it is possible to prepare a good foam.

It is believed that the solvent serves to dissolve the blowing gas, such as nitrogen or carbon dioxide, which generates due to the decomposition of the decomposition-type blowing agent in the closed mold, and to firmly hold such a blowing gas while the mold is closed.

Furthermore, it is believed that, since the composition is blown in the presence of the specific solvent compatible with PVC, the viscoelasticity of the system is lessened, and the residual stress or strain caused by the elongation of the cell membrane on expanding is reduced.

It is also believed that the stress or strain is rapidly relaxed wile the solvent evaporates away after expanding.

As a result of the various possible effects mentioned above, the advantageous of the reduction in the amount of deformation of the foam on burning, or the reduction in the amount of change in dimension of the foam when used at high temperatures, are secured.

As a PVC referred to in this specification, a homopolymer of vinyl chloride is most desirable in view of its combustion properties, such as carbonization. However, copolymers containing not less than 50% by weight vinyl chloride or a mixture of polyvinyl chloride with at least one type of blending resin, such as chlorinated polyvinyl chloride, chlorinated polyethylene and ethylene-vinyl acetate copolymer are within the scope of this invention. The content of such a blending resin in the mixture is desirably small; preferably not more than 50% by weight, particularly not more than 30% by weight, and further particularly not more than 20% by weight. The typical PVC used in the invention is a homopolymer of vinyl chloride. Such a PVC homopolymer is not specially restricted in its type or its method of preparation. However, it is preferable that it is a suspension polymerized PVC, in terms of its low cost. A PVC of a polymerization degree of less than 1500 has a tendency to permit breakage of cell membranes on expanding, and decrease in the expansion ratio due to escape of the blowing gas, while a pVC of a polymerization degree of more than 5000 has a tendency to be difficult to prepare. Herein the suspension polymerized PVC means porous PVC of particle size of 100 to 300 $\mu$m composed of aggregates of primary particles of particle size of about 1 $\mu$m, which is prepared by a suspension polymerization process. Such a primary particle is composed of domain particles of a particle size of about 0.1 $\mu$m. Such a domain particle, in turn, is composed of microdomain particles of a particle size of about 0.01 $\mu$m. Besides suspension PVC, dispersion PVC (paste PVC) also can be used. Dispersion PVC is generally spheric, fine particles of less than several $\mu$m particle size and is prepared by an emulsion or microsuspension polymerization process; such a fine particle is composed of many further fine particles of further small particle size.

As an inorganic substance in the invention, ones containing inorganic fibers of not less than 1 $\mu$m in diameter are used.

Various fibers can be used as the abovementioned inorganic fiber of not less than 1 $\mu$m diameter, including rock wool, glass fiber, ceramic fiber, alumina fiber, carbon fiber, quartz fiber, boron fiber, various metal fibers, and various whiskers. Each of these fibers is used singly or two or more of them can be used in combination. Among them, however, rock wool is most desirable in terms of its easy expansion moldability, various properties of foam made therefrom, and cost.

As for the length of the inorganic fiber used in the invention, the longer fibers exhibit better foam-filling effect, and the shorter fibers exhibit better filling workability. Accordingly, the length is preferably 10 $\mu$m to 50 mm, particularly 20 $\mu$m to 20 mm, and most particularly 100 $\mu$m to 10 mm.

The amount of the inorganic fiber used can be adjusted appropriately in accordance with the final purpose for which the foamed article made therefrom will be used.

The amount of the inorganic fiber (for example, rock wool) of not less than 1 $\mu$m diameter used for the purpose of preventing collapse of the foam, or the like, is usually not less than 2 parts by weight, preferably not less than 5 parts by weight, and further preferably not less than 10 parts by weight per 100 parts by weight of PVC. The main purpose of incorporating such inorganic fibers into the foam is to maintain the form of the foam even when it is forcedly burned. However, too much of the inorganic fiber makes the preparation of the foam difficult, and increases the cost of preparation. The amount is desirably not more than 200 parts by weight, preferably not more than 100 parts by weight, and further preferably not more than 50 parts by weight per 100 parts by weight of PVC.

As an inorganic substance other than the abovementioned inorganic fiber of not less than 1 $\mu$m diameter in the invention, inorganic particles can be used.

As such inorganic particles, those of average particle size of about 0.01 to 300 $\mu$m are used. The use of particles of larger specific area usually shows advantages, in that the amount of deformation of the foam on burning is smaller, and the dimensional stability of the foam when used at high temperatures is larger. The inorganic particles are not specially limited in their type, but they are preferably talc, carbonates such as calcium carbonate, metal hydroxides, and inorganic hydrous compounds. Sometimes, hollow materials such as "Shirasu" balloons are also useful.

As the above-mentioned metal hydroxide, for example, aluminum hydroxide (dehydrating point 300° C.), magnesium hydroxide (dehydrating point 350° C.), calcium hydroxide (dehydrating point 580° C.), tin hydroxide (dehydrating point 160° C.) and the like are useful. Among them, however, aluminum and magnesium hydroxides are desirable because their dehydrating points are not so low that the dehydrating reaction starts during the process of preparing the foam, and yet not so high that the dehydrating reaction may start only after substantial burning of the foam.

The above-mentioned metal hydroxides, represented by aluminum and magnesium hydroxides, are dehydrated when the foam is heated to 200° to 400° C. Such an endothermic dehydrating reaction lessens the amount of heat generated by burning the foam thereby repressing the rise of temperature of the foam and reducing the amount of deformation of the foam. Among them, aluminum hydroxide is particularly preferably. As for the particle size of the above-mentioned metal hydroxide, smaller particle sizes provide better filling effect. However, consideration a balance with cost, particles of average particle size of 0.2 to 60 $\mu$m are usually used.

As inorganic hydrated compounds useful in the invention, there can be cited, for example, calcium sulfate dihydrate (dehydrating point 128° C.), aluminum oxide monohydrate (dehydrating point 360° C.), aluminum arihydrate (dehydrating point 150° C.), zinc borate hydrate ($2ZnO.3B_2O_3.3.5H_2O$, dehydrating point 260° C.), and the like. Among them, zinc borate hydrate and aluminum oxide monohydrate are preferable because their dehydrating points are not so low that the dehydrating reaction may start during the process of preparing the foam. Again, smaller size particles exhibit better filing effects. However, considering a balance with cost, particles of average particle size of 0.5 to 50 $\mu$m are usually used.

The amount of the above-mentioned inorganic particles used is adjusted appropriately in accordance with the expansion workability and the intended use of the final foamed article. The amount of the inorganic particles used is usually not less than 198 parts by weight, preferably not less than 300 parts by weight, particularly preferably not less than 400 parts by weight.

An amount of the inorganic substance of less than 200 parts by weight has a tendency to lessen the effect on combustion properties. The use of higher amounts improves flame resistance, however, such larger amounts have a tendency to cause drawbacks including increases in the thermal conductivity, brittleness, and weight of the foamed article. Therefore, to meet the quasi-noncombustive standard, it is usually appropriate to employ not more than 1000 parts by weight, preferably not more than 800 parts by weight, and particularly preferably not more than 700 parts by weight per 100 parts by weight of PVC.

For the purpose of meeting the quasi-noncombustive standard, it is desirable to use such a metal hydroxide in proportion of 80 to 800 parts by weight, and particularly of 150 to 300 parts by weight per 100 parts by weight of PVC in order to improve the endothermic property of the foam.

On the other hand, for the purpose of making a rigid foamed article as a noncombustive material (used as an insulating material or the like) specified in Notice No. 1231 by the Ministry of Construction (Japan), it is desirable to use metal hydroxides, represented by aluminum hydroxide which has a large endothermic effect, as an inorganic substance in an amount of at least 900 parts by weight, and particularly at least 1000 parts by weight per 100 parts by weight of PVC. In addition, when taking into account achieving crack prevention and the like, it is desirable to use an inorganic fiber in an amount of 2 to 10 parts by weight per 100 parts by weight of PVC.

As for the amount of the inorganic substance used, higher amounts improve the flame resistance of the foam, but such higher amounts have a tendency to cause drawbacks, such as increases in the thermal conductivity, brittleness, and weight of the foam as mentioned above. Therefore, when trying to meet the noncombustive standard, it is desirable that the amount of the inorganic substance containing metal hydroxides, represented by aluminum hydroxide, is not more than 2000 parts by weight, preferably not more than 1500 parts by weight, and particularly preferably not more than 1100 parts by weight per 100 parts by weight of PVC.

In order to obtain a foam which has a good cell size and meets the quasi-noncombustive or noncombustive standard, it is desirable that the inorganic substance contains a nucleating agent.

As such a nucleating agent, for example, talc, which is used most generally, is useful. Among various nucleating agents, talc exhibits excellent control of the cell size in a foam. As for the particle size of the nucleating agent, the smaller particle size usually has a tendency to make the cell size of the foam smaller, and so the size of the nucleating agent is selected in accordance with the desired cell size; the average particle size of the nucleating agent is usually about 1 to 50 $\mu$m.

It is desirable that the amount of the above-mentioned nucleating agent used is usually 30 to 200 parts by weight, and preferably 50 to 150 parts by weight per 100 parts by weight of PVC.

Since the rigid foamed article of the invention contains a large amount of an inorganic substance, an inappropriate preparative process may possibly cause decrease in its impact resistance or an increase in its water absorption or water vapor permeability.

Therefore, because such an undesirable situation may arise, it is important that the particle size (specific surface area) and the amount of the inorganic substance be appropriately controlled.

In other words, it is possible to obtain an excellent foamed article having both a high impact resistance and a high water resistance, without any decrease in its high thermal resistance, by appropriately controlling both the degree of contact of the inorganic substances with each other in the cell membrane of the foam, and the area of the interface of the inorganic substance and the PVC. Thus, the thermal resistance is maintained at a high level by keeping the degree of contact of the inorganic substance with each other higher than a certain level. Both the impact resistance and the water resistance are improved by reducing the area of interface between PVC and the inorganic substance.

These properties can be accurately specified using the total surface area of the inorganic substance per unit amount of PVC as a measure. Usually, in order to improve the impact resistance and to reduce the water absorption and the water vapor permeability, it is desirable to control the total surface area of the inorganic substance per one gram of PVC to 3 to 30 $m^2$, preferably to 5 to 25 $m^2$, and particularly preferably to 8 to 18 $m^2$.

Even where the amount of the inorganic substance used is relatively small, it is possible to increase the total surface area of the inorganic substance per one gram of PVC by using an inorganic substance having a small particle size (that is, a large specific surface area). For example, it is possible, even where the amount of the inorganic substance is about 200 parts by weight, the total surface area per one gram of PVC can still be about 8 $m^2$.

However, since inorganic substances having small particle sizes are usually expensive, the type and amount of the inorganic substance to be actually used should be selected by balancing their advantages and disadvantages; including the decrease of thermal conductivity, and the improvement in brittleness, and light weight due to the reduction of the amount of the inorganic substance used.

As a solvent for use in the invention, there should be chosen a material which, when put up in a composition composed of 100 parts by weight of PVC of average polymerization degree of 2400, 100 parts by weight of the solvent, and 6 parts by weight of dibasic lead stearate, and the composition is kneaded using a plastograph at 30 rpm while raising the temperature, exhibits a maximum torque of 4 to 25 N.m.

Determination of the criterion of compatibility between PVC and a solvent may be possible by various methods including the method of observing the process of gelation of a mixture kneaded by a plastograph, and the method of heating the solvent, in which PVC is suspended, in a transparent vessel and measuring the temperature at which the solvent turns clear. It is considered that a dynamic method is more suitable than a static method because evaluation under dynamic conditions more closely simulates the situation of the actual preparing process. For this reason, the method using a plastograph, which is commonly used in the art, is preferably employed in the invention.

The reason for using a mixture of 100 parts by weight of PVC of average polymerization degree of 2400, 100 parts by weight of the solvent, and 6 parts by weight of dibasic lead stearate is because the operability of the plastograph is taken account of, and because this represents a condition similar to that which persons skilled in this art usually use to investigate the PVC-plasticizability of a plasticizer. As the above-mentioned plastograph, Brabender's PLASTI-CORDER ® is used. The reason for setting 30 rpm as the revolving speed is because it is a revolving speed which is generally adopted when investigating the process of kneading and gelation of PVC compositions using the above-mentioned plastograph.

The surface of a PVC particle melts on heating, and PVC particles begin to stick with each other. Thus, the torque value with the plastograph gradually increases. At a temperature at which the maximum torque value is reached, almost all particles completely stick to each other, however, their core parts still remain stiff.

Since a solvent which is compatible with PVC easily migrates into the internal portions of PVC particles, and so the amount of the solvent present at the surface section of PVC particles decreases, the friction between particles adhered to each other increases, and the torque value also increases. Thus, it is considered that a solvent which exhibits a larger maximum torque value has a higher compatibility with PVC.

Therefore, it is desirable that the maximum torque value which is exhibited by a solvent is high. However, since too high a maximum torque value causes the temperature necessary to cause expansion of the PVC to reduce, whereby necessitating cooling the foam to a considerable low temperature during expanding, and causing a loss of energy, it is desirable that the maximum torque value should be not higher than 25 N.m, preferably at most 20 N.m, and particularly preferably not higher than 15 N.m.

On the other hand, the lower maximum torque value which is exhibited by a composition comprising a solvent as aforesaid generally results in a lower expansion ratio of the foam. Therefore, in order to give the foam an expansion ratio of not less than 50 times, it is desirable that the maximum torque value is not lower Generally, the lower temperature at which a solvent exhibits the maximum torque value (hereinafter referred to as "the maximum torque temperature"), the lower the expanding temperature; too low a maximum torque temperature, necessitates carrying out the expanding process with cooling, e.g., at not higher than 0° C. which is difficult to be industrially practiced.

On the contrary, there is a tendency that the higher the maximum torque temperature is, the higher the expanding temperature is. When the expanding temperature is too high, there is a tendency that there occurs the energy loss and that working condition deteriorates, and as a result, it is difficult to industrially produce a foamed article.

Taking account of the above-mentioned conditions, it is desirable that the maximum torque temperature is 40° to 150° C., particularly 50° to 140° C., and most particularly 60° to 130° C.

As a solvent which satisfies the above-mentioned conditions, there can be cited, for example, mixed solvents of an aromatic solvent and a ketone, mixed solvents of an ester and a ketone, and mixed solvents of a cellosolve and a ketone. Specifically, they are, for example, a mixed solvent of toluene/cyclohexanone (3/1 to 15/1 as weight ratio—hereinafter the same—), a mixed solvent of toluene/acetone (2/1 to 15/1), a mixed solvent of toluene/diisobutylketone (5/1), a mixed solvent of toluene/methylethylketone (5/1), a mixed solvent of toluene/cyclopentanone (5/1), a mixed solvent of toluene/methylisobutylketone (5/1), a mixed solvent of toluene/mesityl oxide (5/1), a mixed solvent of toluene/dimethylformamide (9/1), a mixed solvent of n-butyl acetate/cyclohexanone (5/1), and the like. However, it is needless to say that these are only examples, and that other solvents also can be adopted provided that they satisfy the above-mentioned conditions of the invention.

It is desirable that the boiling point of the solvent (or the mixed solvent) specified in the invention be 0° to 250° C., particularly 10° to 210° C., and most particularly 20° to 190° C. A solvent having too low a boiling point possibly evaporates away during kneading the formable composition, and a solvent having too high a boiling point is difficult to evaporate away from the foam after expansion molding.

Solvents used in the invention do not include a polymerizable liquid monomer, such as styrene monomer or acrylonitrile monomer, because such a monomer possibly polymerizes during the process for preparing the foam, and, when it remains in the final foamed article, largely making its combustive properties poorer.

It is desirable that the above-mentioned solvent is contained in the foamable composition in a relatively large amount because the degree of incorporation of the inorganic substance into the homogeneous gel phase of PVC and the solvent is appropriately controlled by the proportion of solvent. Thus, when the resulting foam contains a large amount of the inorganic substance, disappearance of the granularity and porosity of PVC improves the blowing gas retentivity of the foam, and the residual stress or strain is lessened. However, too large an amount of the solvent may sometimes reduce the expanding temperature down to a level which is industrially unsuitable. The amount of the solvent used is also dependent on the average polymerization degree of PVC, the degree of the compatibility between the solvent and PVC, the type, the amount of the inorganic substance used, and the like. For the above-mentioned reasons, however, it is preferred to use 250 to 3000 parts by weight, particularly 350 to 2000 parts by weight, most particularly 450 to 1000 parts by weight of solvent per 100 parts by weight of PVC.

As the decomposition-type blowing agent used in the invention, there can be cited, for example, azodicarbonamide, azobisisobutyronitrile, diazoaminobenzene, dinitrosopentamethylenetetramine (hereinafter referred to as "DPT"), p-toluenesulfonylhydrazide, and the like. They are decomposed by heat and generate nitrogen gas. The reason for appropriately using such a decomposition-type, nitrogen gas-generating blowing agent in the invention is because nitrogen gas does not readily permeate away out of the foam during the process of evaporating away the solvent after expansion. Among the above-exemplified decomposition-type blowing agents, DPT is particularly appropriate because of its low cost, and because it can be readily used alone in the invention. The reason for the fact that DPT can be used alone in the invention is not still clear. It is believed, however, that its function as a blowing agent is fully exhibited by the complete contact between DPT and a blowing aid available when a large amount of a solvent which has a good solubility for DPT and for the blowing aid is employed in order to obtain a good foamed article.

Japanese Examined Patent Publication No. 52115/1986 requires the use of azo-type or sulfur-type radical-generating agents as an essential condition, and specifies that, in the absence of such a radical-generating agent, the composition does not expand. According to this invention, however, even when no radical-generating agent is used, for example, even when DPT, which does not generate any radical, is used as a blowing agent, it is possible to produce a good blown product. Thus, it is clear that the invention is based on quite a different blowing mechanism.

DPT has a large amount of heat of decomposition. At a molding temperature (for example, a press temperature of 175° C. or so) sufficient to decompose and blow DPT in conventional known methods, the use of DPT alone is apt to cause decomposition of PVC due to its high heat of decomposition. On the contrary, in the invention, the use of a good solvent for PVC makes the domain structure of PVC disappear at a low temperature, and makes it possible to maintain the blowing gas. By this means the invention makes it possible to press mold the composition at a low temperature of 130° to 150° C. to prevent the thermal decomposition of PVC.

The cost of an industrial foamed article can be largely reduced if scraps, which are yielded, for example on cutting a foam into a prescribed size of foamed articles, are reused in another lot of the expansion molding. In the invention, the expansion molding at a low temperature, by reason of use of DPT, makes it possible to successfully prevent troubles concerning the thermal decomposition of PVC due to the exothermic molding or due to the heat history of the recycled PVC composition. It is especially noted that because of this, recycling the previously foamed PVC material is made possible.

In the invention, combined use of DPT with a zinc-containing compound is desirable since it largely reduces the heat generated from the rigid foam therefrom on burning.

The mechanism wherein the zinc compound reduces the heat generated from the formation of a rigid foam in which DPT is used is not still clear. However, it is believed that some residue of decomposed DPT, which promotes the deterioration of PVC, is scavenged by the zinc compound.

The above-mentioned zinc-containing compound is a zinc-containing inorganic compound and/or a zinc-containing organic compound. Particularly, it is, for example, zinc borate, basic zinc carbonate, zinc sulfide, zinc phosphate, zinc stearate, zinc octanoate, and the like. Such a zinc-containing compound is used singly or in combination with another. The amount of the zinc-containing compound used in generally 5 to 95 parts by weight per 100 parts by weight of PVC. The amount of a zinc-containing inorganic compound used is preferably 5 to 70 parts by weight, and particularly preferably 10 to 50 parts by weight per 100 parts by weight of PVC; the amount of the zinc-containing organic compound used is preferably 5 to 20 parts by weight per 100 parts by weight of PVC. An inorganic compound is preferably to an organic compound because it generates a smaller amount of heat on burning.

The use of less than the above-mentioned lower limit of such a zinc containing compound is ineffective in reducing the heat generated on burning. The use of it more than the above-mentioned upper limit likely makes it impossible to make such articles at a commercially advantageous cost.

The amount of the above-mentioned decomposition-type blowing agent used may depend on the desired expansion ratio, types of the blowing agent, inorganic fiber, inorganic granular particle, solvent, and the like. However, it is usual to use 5 to 100 parts by weight, preferably 10 to 50 parts by weight, and further preferably 20 to 50 parts by weight of blowing agent per 100 parts by weight of PVC. Amounts of the above-mentioned decomposition type blowing agent less than 5 parts by weight are possibly insufficient to cause the resulting foam product to attain the desired expansion ratio, and amounts more than 100 parts by weight possibly result in breakage of cell membranes on expanding.

The above-mentioned blowing agent can be used in combination with a blowing aid, for example, a urea-type blowing aid, and the like, if necessary.

As a stabilizer in the invention, any type of stabilizer is useful provided that it has a capacity to prevent deterioration of PVC. Examples of stabilizers are, for instance, dibasic lead stearate, dibasic lead phosphite, tribasic lead sulfate, zinc stearate, calcium stearate, and the like. Such a stabilizer is not always used in applications where heat resistant properties are not required. However, the amount of such a stabilizer used is usually 2 to 20 parts by weight, and preferably 3 to 7 parts by weight per 100 parts by weight of PVC. Amounts more than 20 parts by weight do not seem to improve the stabilizing effect so much, and might be disadvantageous in cost.

It is needless to say that, in the invention, ingredients which are usually used as additives for plastics can be appropriately employed if necessary, including pigments such as titanium dioxide and ultramarine, and antistatic agents such as tertiary amines and alkyl sulfonates.

An example concerning the process for preparing a foamable composition and the process for preparing a rigid, foamed article therefrom, according to the invention, is described as follows.

First, a prescribed amount of raw material is fed into a kneader, such as a twin kneader, wherein the temperature is adjustable and the raw material can be kneaded by a high shear force. The kneading operation is carried out at a temperature of at least the temperature whereat PVC and the solvent exhibit compatibility, but of at most the boiling point of the solvent, until the inorganic fibers are well disentangled and each material is uniformly dispersed. If necessary, the temperature of the composition is lowered, and then the blowing agent is added at a temperature of at most the decomposing point of the blowing agent, and the kneading operation is continued.

In this specification, the temperature at which compatibility is exhibited means the temperature at which, when a mixture which is composed of PVC, the inorganic substance, solvent, and stabilizer is kneaded using a plastograph at an arbitrary kneading speed while raising the temperature from room temperature, the mixture exhibits the maximum torque. This temperature is different according to the type and amount of each material, the type of the kneading machine, the kneading conditions, and the like. The reason for kneading at a temperature of at least the temperature at which PVC and the solvent exhibit compatibility, but of at most then the boiling point of the solvent is because, when kneading at a temperature lower then the temperature at which PVC and the solvent exhibit compatibility, the basic principle of the invention that, during kneading the foamable composition, the solvent disentangles PVC to a molecular order to form a homogeneous gel phase of PVC and the solvent is not satisfied, and because, when kneading at a temperature higher than the boiling point of the solvent, the solvent largely evaporates away during kneading the foamable composition.

When a decomposition-type blowing agent, which begins to decompose at a temperature whereat PVC and the solvent exhibit compatibility, is used, PVC, the inorganic fibers, solvent and stabilizer are kneaded together at a temperature of at least the temperature at which PVC and the solvent exhibit compatibility, and the decomposition-type blowing agent is added at a temperature of at most the decomposing point of the decomposition-type blowing agent, and then the resulting mixture is further kneaded.

Then, the prepared foamable composition is filled into a closable mold, suitably made of aluminum alloy, for example, and the mold is mounted in a hydraulic heating press, and then heated under pressure. Although pressing and heating conditions are different depending on the composition of the foamable composition, it is necessary that the conditions be sufficient to substantially complete the decomposition of the decomposition-type blowing agent. For this purpose, both a temperature and a pressure, for example, a temperature of 110° to 180° and a pressure of at least 140 kg/cm$^2$, are selected appropriately according to the nature of the foamable composition. When the prescribed temperature (for example, a temperature of at least 130° C.) is reached, it is desirable to maintain that state for about 5 to 30 minutes or so. Then, the temperature of the pressure/heat plate of the closed mold is lowered down to a temperature appropriate to expand, using a cooling medium such as water and the like. The temperature appropriate to expand is different depending on the composition of the foamable composition, and the form and size of the mold, or like, but usually is a temperature lower than the temperature of the press/heat, and at which the PVC phase has sufficient viscoelasticity so that the blowing gas will not leak away due to breakage of cell membranes on expanding. A temperature appropriate to expansion is about 30° to 100° C., for example. When the temperature of the content of the mold reaches the temperature appropriate to expand, it is released to atmospheric pressure and is expanded to obtain a desired foam.

The employed solvent remains in the foam just after expansion. The residual solvent is evaporated away by allowing the foam to stand at a temperature appropriate to the particular solvent for an appropriate time. Removing the organic solvent from the foam can be also promoted by cutting the foam, using a cutter or the like, to give a larger surface area.

As for the expansion ratio of the rigid foamed article of the invention, it is desirable that the expansion ratio is not less than 50 times when the rigid foamed article is to be used as a heat insulating material which meets the requirements of the model box test (the quasi-noncombustive standard) or the substrate material test (the noncombustive standard) according to Notice No. 1231 of the Ministry of Construction (JAPAN). In consideration of the amount of generated heat and smoke on burning and profitability, the foam is desirable to have further high expansion ratio. Therefore, the expansion ratio is preferably not less than 60 times, and most particularly not less than 80 times. A normal foam having an expansion ratio higher than 200 times is difficult to prepare, and, if prepared, would be poor in its properties, such as mechanical strength. Therefore, it is desirable that the expansion ratio is not more than 200 times.

The above description is only an example of process which are suitable for preparing foams of the invention, and foams of the invention can also be prepared by other processes.

A further detailed description of the foamable composition, the process for preparing such, and the rigid foam article prepared therefrom by the practice of this invention is given based on the following Examples, but the scope of this invention is not limited by these Examples.

EXAMPLES 1 TO 5

Raw materials listed in Table 1 were weighed in the proportions shown in Table 2 to a total weight of 5000 g.

All raw materials, other than the blowing agent, were fed into a twin kneader of effective capacity of 3 l, and kneaded together for 30 minutes. The kneading temperature, as shown in Table 2, was controlled by passing hot water through the jacket of the kneader.

The temperature of the thus obtained composition in the kneader was then lowered down to about 60° C., by passing warm water through the jacket of the kneader, the blowing agent was added, and the thus produced composition was subsequently kneaded together for 10 additional minutes to obtain a foamable composition.

The obtained foamable composition was filled into an aluminum alloy mold of cavity size of 160 mm×160 mm×22 mm and the mold was covered with an aluminum plate and mounted in a hydraulic heat press machine. The temperature was then raised from room temperature (about 20° C.) to 175° C., taking 10 minutes.

The clamping pressure of the press machine was about 150 kg per 1 cm$^2$ of the mold area in each Example.

After maintaining the mold at 175° C. for 30 minutes, the temperature of the mold was lowered down to a temperature appropriate to expand (that is, the expanding temperature), taking about 10 minutes, by passing warm water through the cooling plate of the press machine, and the mold was kept at the same temperature for about 30 minutes.

When the press machine was released from the clamping pressure, the expansion of the content of the mold was completed in about one second.

Obtained foams always had a good appearance and also had good cell uniformity as seen on cutting planes.

After standing at room temperature for about a half day, the foam was placed in a hot air circulating oven, and maintained at 45° C. for about a half day, and then at 80° C. for about one day to evaporate away the solvent.

Then the apparent density, expansion ratio, percentage of closed cells, volume retention ratio on heating, and degree of carbonization on burning of the foam were determining according to the following procedures. Results are shown in Table 2. (Apparent density)

A cube of 25 mm×25 mm×25 mm or a rectangular parallelopiped of 75 mm ×25 mm×15 mm was cut into from the foam and its volume an weight were measured.

(Expansion ratio)

The apparent density of PVC in the foam was calculated from the amount (formulated parts by weight) of the inorganic substance, blowing agent, and stabilizer per 100 parts by weight of PVC shown in Table 2, according to the following equation:

[Apparent density of $PVC$ in foam] = [apparent density of foam] × 100/(100 + [total amount of inorganic substance + blowing agent + stabilizer]) in (g/cm$^3$)

Based upon a specific gravity of PVC of 1.4, the expansion ratio was calculated according to the following equation:

[Expansion ratio]=[1.4/(apparent density of PVC in foam)]×[(times)]

(Percentage of closed cells)

According to ASTM D2856, the percentage of closed cells was determined using an air comparison-type densimeter (Toshiba—Beckmann).

(Volume Retentive Ratio on Heating)

A rectangular parallelopiped, 75 mm×25 mm×15 mm, sample piece was cut from the foam, and put in a 200 ml capacity graduated cylinder into which water had been poured to about one half of the graduated part. The parallelopiped was forced under the water with a pushing tool. The volume of the sample piece before heating was obtained from the difference of the readings of the graduated cylinder before and after putting the sample into it. After air drying, the sample piece was allowed to stand in a hot air-circulating oven at 200° C. for one hour.

The volume of the sample piece after heating was obtained in the same manner as for that before heating.

The volume retention ratio on heating was calculated according to the following equation:

[Volume retentive ratio on heating]=([volume after heating]/[volume before heating])×100(%)

(Degree of Carbonization)

A surface test was carried out in accordance with JISA 1321, and the degree of carbonization of the foam on burning was evaluated based on the following criterion for evaluation.

(Criterion for Evaluation)

◯: The burned section of the foam rapidly extinguishes the fire, and is carbonized and turns black. It still holds a certain amount of strength and is not collapsed too easily.

×: The burned section of the foam is still ignited and finally turns to white ash, which holds no more strength and is easily collapsed.

The Brabender's plastograph was operated in accordance with the following operating conditions: (Operating conditions of Brabender plastograph)

Each of PVC, dibasic lead stearate and the solvent is weighed at room temperature and they are well mixed together using a spatula in a beaker to form a paste-like mixture.

Such a paste-like mixture is fully filled into the kneading chamber of the plastograph which has been cooled down to room temperature.

The temperature of the plastograph is raised by passing the heating medium, which has been maintained at 170° C. in a reservoir through the jacket while revolving the rotors of the plastograph at 30 rpm. Then, both the temperature of the paste-like mixture and the torque applied to the rotor are continually recorded with a pen recorder.

The torque begins to rise at a certain temperature (different depending on the type of solvent) up to a maximum value, and then slowly falls. Both the exhibited maximum torque value and the temperature of the paste-like mixture at that time are read and recorded.

TABLE 1

| Raw material | Description | Note |
|---|---|---|
| PVC | X-2380 | Suspension resin (available from Kanegafuchi Kagaku Kogyo Kabushiki Kaisha), P* = 2380 |
| | KS-1700 | Suspension resin (available from Kanegafuchi Kagaku Kogyo Kabushiki Kaisha), P* = 1700 |
| | PSH-660 | Dispersion resin (available from Kanegafuchi Kagaku Kogyo Kabushiki Kaisha), P* = 2400 |
| | TK-2500HS | Suspension resin (available from Shin-etsu Kagaku Kogyo Kabushiki Kaisha), P* = 2460 |
| Rock wool | Rock wool | Diameter: 5 μm, average fiber length: 3 mm |
| Inorganic particle | Talc | Average particle size: 5.5 μm |
| | Calcium carbonate | Particle size: through 70 mesh |
| Solvent | Cyclohexanone | |
| | Acetone | |
| | Toluene | |
| Blowing agent | AIBN | Azobisisobutyronitrile |
| | ADCA | Azodicarbonamide |
| | DPT | N,N'-dinitrosopentamethylenetetramine |
| Stabilizer | SL | Dibasic lead stearate |
| | TB | Tribasic lead sulfate |
| Blowing aid | CP | Urea-type composition |
| Recycled material | RC-A | Material obtained by crushing non-recycled foam (<5 mm) |
| | RC-B | Material obtained by crushing 3 times recycled foam (<5 mm) |

Note: *P: average polymerization degree.

COMPARATIVE EXAMPLE 1

A foam was obtained under the same conditions as those for Example 3, except that only toluene was used without cyclohexanone.

The obtained foam had a low percentage of closed cells of 24%, and shrank and deformed to a saddle-like form during evaporation of the solvent. The expansion ratio of the obtained foam was 15 times (about one sixth of that in Example 3). The maximum torque of the toluene containing composition was 3.8 N.m.

COMPARATIVE EXAMPLE 2

A foam was obtained under the same conditions as those of Example 4, except that the kneading temperature of the twin kneader was set at 30° C. (a temperature below 80° C.: the temperature at which the mixed solvent of 67 parts by weight of cyclohexanone and 333 parts by weight of toluene (weight ratio=1/5) exhibits the maximum torque).

The obtained foam had a low percentage of closed cells of 40%, and shrank during evaporating away the solvent. Its expansion ratio was 18 times (about one third of that in Example 4).

TABLE 2

| | Components of composition (parts by weight) | | | | | | | | |
|---|---|---|---|---|---|---|---|---|---|
| | | Inorganic substance | | | Organic solvent | | | | |
| Example No. | PVC | Rock wool | Talc | CaCO₃ | Kind | Max. torque temp. (°C.) | Max. torque (N · m) | Blowing agent | Stabilizer |
| 1 | X-2380 | (30) | (240) | (80) | Cyclohexanone (83) | 80 | 10.8 | AIBN (35) | SL (6) |

TABLE 2-continued

| | | | | | | | | | |
|---|---|---|---|---|---|---|---|---|---|
| | (100) | | | | Toluene (417) | | | | |
| 2 | X-2380 (100) | (100) | (240) | (60) | Cyclohexanone (100) Toluene (500) | 80 | 10.8 | AIBN (35) | SL (6) |
| 3 | PSH-660 (100) | (30) | (240) | (60) | Cyclohexanone (83) Toluene (417) | 80 | 10.8 | AIBN (40) | SL (6) |
| 4 | PSH-660 (100) | (75) | (160) | (40) | Cyclohexanone (67) Toluene (333) | 80 | 10.8 | AIBN (35) | SL (6) |
| 5* | X-2380 (100) | (30) | (240) | (60) | Cyclohexanone (83) Toluene (417) | 80 | 10.8 | *DPT (20) | TB (6) |
| Comp. Ex. 1 | PSH-660 (100) | (30) | (240) | (60) | Toluene (500) | 104 | 3.8 | AIBN (40) | SL (6) |
| Comp. Ex. 2 | PSH-660 (100) | (75) | (160) | (40) | Cyclohexanone (67) Toluene (333) | 80 | 10.8 | AIBN (35) | SL (6) |

| | | | Properties of foam | | | | |
|---|---|---|---|---|---|---|---|
| Example No. | Kneading temp. (°C.) | Blowing temp. (°C.) | Apparent density (g/cm³) | Expansion ratio (times) | Percentage of closed cells (%) | Volume retentive ratio on heating (%) | Degree of carbonization |
| 1 | 97 | 40 | 0.086 | 77 | 67 | 73 | ○ |
| 2 | 96 | 35 | 0.097 | 78 | 61 | 94 | ○ |
| 3 | 98 | 30 | 0.069 | 98 | 69 | 83 | ○ |
| 4 | 87 | 40 | 0.115 | 51 | 67 | 91 | ○ |
| 5* | 98 | 34 | 0.100 | 71 | 61 | 71 | ○ |
| Comp. Ex. 1 | 100 | 40 | 0.439 | 15 | 24 | 96 | ○ |
| Comp. Ex. 2 | 30 | 40 | 0.324 | 18 | 40 | 93 | ○ |

Note: *In Example 5, 20 parts of a urea-type blowing aid was used in combination with DPT.

EXAMPLE 6

A specimen of 220 mm (length)×220 mm (breadth)×25 mm (thickness) was cut off from the foam obtained in Example 2, and submitted to a surface test according to JIS A 1321. The temperature-time area (tdθ) was 7° C.min; the coefficient of smoke (cA) was 6, and the dimension of the specimen after test was 216 mm (length)×217 mm (breadth). The amount of generated heat, the amount of smoke, and the amount of deformation of the foam on burning were all found to be small.

These results prove that a rigid foam which contains an inorganic substance, such as rock wool, which is not harmful to human safety and health, made of the foamable composition of the invention, is excellent in dimensional stability or thermal resistance when used at high temperatures, is small in its amounts of generated heat, smoke, generated noxious gas, and deformation on burning, and has a large percentage of closed cells, and that a foamable composition from which such a foam is obtained can be easily and advantageously prepared, on an industrial scale in accordance with this invention.

EXAMPLES 7 TO 12

Raw materials listed on Table 1 were weighed in the proportion shown in Table 3 to a total weight of 5000 g.

All raw materials other than the blowing agent were fed into a twin kneader of effective capacity of 3 l, and kneaded together for 30 to 50 minutes while controlling the kneading temperature as shown in Table 3 by passing hot water through the jacket of the kneader to obtain a composition.

The temperature of the composition in the kneader was then lowered down to about 70° C., by passing warm water through the jacket of the kneader, a blowing agent was added, and the composition subsequently kneaded for a further 10 minutes to obtain a foamable composition.

The resulting foamable composition was filled into an aluminum alloy mold of cavity size of 160 mm×160 mm×22 mm, and the mold was covered with an aluminum plate and mounted on a hydraulic heat press machine, and the temperature was raised from room temperature (about 20° C.) to 145° C. taking 10 minutes.

The clamping pressure of the press machine was about 150 kg per 1 cm² of the mold area in each Example.

After maintaining the mold at 145° C. for 10 minutes, the temperature of the mold was lowered down to a temperature appropriate to expand (30° to 35° C.), taking about 15 minutes, by passing warm water through the cooling plate of the hot press machine.

When the press machine was released from the clamping pressure, the expansion of the contents of the mold was completed after about one second.

Obtained foams always had a good appearance and also had good uniformity of cells on cutting planes.

The foam was placed in a hot air circulating oven, and was allowed to stand at 55° C. for about a half day, and further at 80° C. for about one day, to evaporate away the solvent.

Then the apparent density, expansion ratio, and degree of carbonization of the foam were determined according to the same procedures as those for Examples 1 to 5. Results are shown in Table 3.

COMPARATIVE EXAMPLES 3 TO 5

Raw materials listed on Table 1 were weighed in the proportion shown in Table 3 to a total weight of 5000 g. A foam was obtained according to the same procedures as those for Examples 7 to 12 except that the temperatures at which the hot press machine operated was regulated as shown in Table 3, and the properties of the foam were determined. Results are shown in Table 3.

TABLE 3

| | Components of composition (parts by weight) | | | |
|---|---|---|---|---|
| Ex- | Inorganic substance | Organic solvent | Blow- | Blow- |

TABLE 3-continued

| ample No. | PVC | Rock wool | Talc | CaCO₃ | Kind | Max. torque temp. (°C.) | Max. torque (N m) | ing agent | ing aid | Recycled mat. | Stabilizer |
|---|---|---|---|---|---|---|---|---|---|---|---|
| 7 | PSH-660 (100) | (20) | (240) | (60) | Cyclohexanone (83), Toluene (417) | 80 | 10.8 | DPT (20) | CP (20) | — | TB (6) |
| 8 | TK-2500HS (100) | (30) | (240) | (60) | Cyclohexanone (83), Toluene (417) | 80 | 10.8 | DPT (20) | CP (20) | — | TB (6) |
| 9 | TK-2500HS (100) | (31) | (100) | (540) | Cyclohexanone (105), Toluene (525) | 80 | 10.8 | DPT (28) | CP (28) | — | TB (6) |
| 10 | TK-2500HS (100) | (31) | (100) | (540) | Acetone (105), Toluene (525) | 78 | 9.7 | DPT (28) | CP (28) | — | TB (6) |
| 11 | TK-2500HS (70) | (21) | (168) | (42) | Cyclohexanone (83), Toluene (417) | 80 | 10.8 | DPT (20) | CP (20) | RC-A (129) | TB (6) |
| 12 | TK-2500HS (80) | (24) | (192) | (48) | Cyclohexanone (83), Toluene (417) | 80 | 10.8 | DPT (20) | CP (20) | RC-B (83) | TB (6) |
| Comp. Ex. 3 | PSH-660 (100) | — | (240) | (60) | Toluene (500) | 104 | 3.8 | DPT (20) | CP (20) | — | TB (6) |
| Comp. Ex. 4 | PSH-660 (100) | — | (240) | (60) | Toluene (500) | 104 | 3.8 | DPT (20) | CP (20) | — | TB (6) |
| Comp. Ex. 5 | PSH-660 (100) | — | (240) | (60) | Toluene (417), Cyclohexanone (83) | 80 | 10.8 | DPT (20) | CP (20) | — | TB (6) |

| Example No. | Kneading temp. (°C.) | Hot press temp. (°C.) | Apparent density (g/cm³) | Expansion ratio (times) | Sectional view | Degree of carbonization |
|---|---|---|---|---|---|---|
| 7 | 100 | 145 | 0.081 | 77 | Uniform, fine cells | ○ |
| 8 | 100 | 145 | 0.093 | 72 | " | ○ |
| 9 | 100 | 145 | 0.125 | 93 | " | ○ |
| 10 | 80 | 145 | 0.225 | 52 | " | ○ |
| 11 | 100 | 145 | 0.085 | 79 | " | ○ |
| 12 | 100 | 145 | 0.080 | 83 | " | ○ |
| Comp. Ex. 3 | 100 | 145 | — | — | Not blow. | — |
| Comp. Ex. 4 | 100 | 175 | — | — | Not blow. | — |
| Comp. Ex. 5 | 100 | 175 | — | — | Very colored. | — |

These results prove that a PVC foam, which has a high expansion ratio and a good cell uniformity on cutting planes and can be recycled, is obtained even with use of an inexpensive blowing agent, DPT, according to the preparing process of the invention.

EXAMPLES 13 TO 18

PVC (PSH-660), a solvent, blowing agent (AIBN), stabilizer (SL) and inorganic particles (talc) which were listed on Table 1, glass fiber [GF-A (diameter 10 μm length 150 μm) or GF-B (diameter 10 μm, length 3 mm)], and other inorganic particles [calcium carbonate (average particle size 14 μm), or aluminum hydroxide (average particle size 25 μm)] were weighed in the proportion shown in Table 4 to a total weight of 5000 g.

All raw materials other than the blowing agent were fed into a twin kneader of effective capacity of 3 l, and kneaded together for 30 minutes, while controlling the kneading temperature as shown in Table 4 by passing hot water through the jacket of the kneader, to obtain a composition.

Then the temperature of the composition in the kneader was lowered down to about 60° C. by passing warm water through the jacket of the kneader, the blowing agent was added, and the composition thus obtained was subsequently kneaded together for a further 10 minutes to obtain a foamable composition.

The resulting foamable composition was filled into an aluminum alloy mold of cavity size of 160 mm×160 mm×22 mm, and the mold was covered with an aluminum plate and mounted on a hydraulic heat press machine, and the temperature was raised from room temperature (about 20° C.) to 150° C. taking 10 minutes.

The clamping pressure of the press machine was about 150 kg per 1 cm² of the mold area in each Example.

After maintaining the mold at 150° C. for 10 minutes, the temperature of the mold was lowered down to a temperature appropriate to expand (that is, the expanding temperature ) taking about 10 minutes, by passing warm water through the cooling plate of the press machine, and the mold was kept at the same temperature for about 15 minutes.

When the press machine was released from the clamping pressure, the expansion of the contents of the mold was completed in about one second.

Obtained foams always had good appearance and also had good uniformity of cells on cutting planes.

The foam was placed in a hot air circulating oven, and was allowed to stand at 55° C. for about a half day, and further at 80° C. for about one day to evaporate away the solvent.

Then the apparent density, expansion ratio, percentage of closed cells, volume retentive ratio on heating, and degree of carbonization of the foam were determined according to the same procedures as those for Examples 1 to 5. A surface test was carried out according to JIS A 1321. Results are shown in Table 4.

COMPARATIVE EXAMPLE 6

A foam was obtained in the same manner as that set forth in Example 16 except that no glass fibers were used, and the properties of the resulting product were evaluated. Results are shown in Table 4.

The obtained foam shrank to a certain extent on heating at 200° C. for one hour. Its volume retentive ratio on heating was 93%. The heat side of the foam in the surface test collapsed and fell down.

COMPARATIVE EXAMPLE 7

A foam was obtained in the same manner as that set forth in Example 16 except that a single solvent of toluene, without cyclohexanone, was used, and the properties of the resulting product were evaluated. Results are shown in Table 4.

This foam had a small percentage of closed cells (7%), and during evaporating away the solvent, severely shrank and deformed to a saddle-like form. Its expansion ratio was only 14 times (1/4.4 times that in Example 16).

health, is excellent in dimensional stability or thermal resistance when used at high temperatures, is small in its amounts of generated heat, smoke, noxious gas and deformation on burning, and that a foamable composition from which such product can be attained can be industrially easily and advantageously prepared according to the preparing process of the invention.

EXAMPLES 19 TO 29

Raw materials listed on Table 5 were weighed in the proportion shown in Table 6 to a total weight of 5000 g.

All raw materials, other than the blowing agent, were fed into a twin kneader of effective capacity of 3 l, and kneaded together for 30 to 50 minutes while controlling the temperature to 85° to 100° C. by passing hot water through the jacket of the kneader to obtain a foamable composition of the invention.

The obtained foamable composition was filled into an aluminum alloy mold of cavity size of 160 mm×160 mm×22 mm, and the mold was covered with an aluminum plate and mounted in a hydraulic heat press machine, and then the temperature was raised from room

TABLE 4

| Example No. | PVC | Inorganic substance | | | | Organic solvent | | Max. torque temp. (°C.) | Max. torque (N m) | Blowing agent | Stabilizer |
|---|---|---|---|---|---|---|---|---|---|---|---|
| | | Glass fiber | Talc | CaCO$_3$ | Al(OH)$_3$ | Toluene | Cyclohexanone | | | | |
| 13 | (100) | GF-A (30) | (100) | (270) | (270) | (458) | (92) | 80 | 10.8 | (42.5) | (6) |
| 14 | (100) | GF-B (10) | (100) | (270) | (270) | (458) | (92) | 80 | 10.8 | (42.5) | (6) |
| 15 | (100) | GF-B (5) | (100) | (270) | (270) | (458) | (92) | 80 | 10.8 | (42.5) | (6) |
| 16 | (100) | GF-B (10) | (100) | (200) | (100) | (417) | (83) | 80 | 10.8 | (42.5) | (6) |
| 17 | (100) | GF-B (5) | (100) | (200) | (100) | (417) | (83) | 80 | 10.8 | (42.5) | (6) |
| 18 | (100) | GF-B (5) | (100) | (270) | (270) | (458) | (92) | 80 | 10.8 | (42.5) | (0) |
| Comp. Ex. 6 | (100) | (0) | (100) | (200) | (100) | (417) | (83) | 80 | 10.8 | (42.5) | (6) |
| Comp. Ex. 7 | (100) | GF-B (10) | (100) | (200) | (100) | (500) | (0) | 104 | 3.8 | (42.5) | (6) |

| Example No. | Kneading temp. (°C.) | Blowing temp. (°C.) | Properties of foam | | | | Surface test | | | | Degree of carbonization |
|---|---|---|---|---|---|---|---|---|---|---|---|
| | | | Apparent density (g/cm$^3$) | Expansion ratio (times) | Percentage of closed cells (%) | Volume retentive ratio on heating (%) | Temp.-time. area (°C. min) | Smoke generation coef. (cA) | Crack generation or the like | Acceptance | |
| 13 | 95 | 30 | 0.104 | 110 | 43 | 100 | 0 | 0.9 | No | Yes | ◯ |
| 14 | 92 | 30 | 0.195 | 57 | 20 | 100 | 95 | 2.4 | No | Yes | ◯ |
| 15 | 98 | 30 | 0.156 | 71 | 42 | 100 | 73 | 1.8 | No | Yes | ◯ |
| 16 | 94 | 30 | 0.127 | 62 | 35 | 100 | 90 | 5.4 | No | Yes | ◯ |
| 17 | 96 | 30 | 0.094 | 82 | 43 | 100 | 45 | 2.1 | No | Yes | ◯ |
| 18 | 94 | 30 | 0.167 | 67 | 43 | 100 | 79 | 1.2 | No | Yes | ◯ |
| Comp. Ex. 6 | 99 | 30 | 0.106 | 72 | 68 | 93 | 93 | 4.5 | * | No | ◯ |
| Comp. Ex. 7 | 99 | 30 | 0.546 | 14 | 7 | 100 | — | — | — | — | — |

Note: *Broken on failed.

From these results, it is found that, in surface tests, the temperature-time area of the foam obtained in Example 13 is 0° C.min, and the coefficient of smoke (cA) of any foam obtained in Examples 13 to 18 is less than 6, and further the volume retention ratio on heating of the latter is 100% without generation of any cracks or the like. Thus, it is found that the obtained foam is small in its amount of generated heat, amount of smoke, and deformation on burning.

As described above, it is found that a foam made of the foamable composition of the invention is a rigid foam which contains an inorganic substance such as glass fiber which is not injurious to human safety and temperature (about 20° C.) to 145° C. taking 10 minutes.

The clamping pressure of the press machine was about 150 kg per 1 cm$^2$ of the mold area in each Example.

After maintaining the mold at 145° C. for 10 minutes, the temperature of the mold was lowered down to a temperature appropriate to expand (30° to 35° C.), taking about 15 minutes, by passing warm water through the cooling plate of the hot press machine.

When the press machine was released from the clamping pressure, the expansion of the content of the mold was completed in about one second.

Obtained foams always had a good appearance an had good cell uniformity on cutting planes.

The foam was placed in a hot air circulating oven and allowed to stand at 55° C. for about a half day, and further at 80° C. for about one day, to evaporate away the solvent.

Then the apparent density, expansion ratio, and degree of carbonization, as properties of the obtained foam, were determined with the same procedures as those for Examples 1 and 5. The temperature-time area as an index of the generated heat on burning was measured according to the followed method. Results are shown in Table 6. (Temperature-time area)

The temperature-time area is determined according to JIS A1321 "Method for testing incombustibility of interior materials of building and their application process".

COMPARATIVE EXAMPLES 8 AND 9

Raw materials listed on Table 5 were weighed in the proportions shown in Table 6 to a total weight of 5000 g. A foam was obtained in the same way as that for Examples 19 to 29, and its properties were determined. Results are shown in Table 6.

TABLE 5

| Raw material | Description | Note |
| --- | --- | --- |
| PVC | Suspension-polymerized vinyl chloride resin | Average polymerization degree: 2450 |
| Blowing agent | DPT | N,N'-dinitrosopentamethylenetetramine |
| Zinc-containing compound | CZ | Basic zinc carbonate |
| | PZ | Zinc phosphate |
| | BZ | Zinc borate |
| | SZ | Zinc stearate |
| | OZ | Zinc octoate |
| | MZ | Zinc maleate |
| Alumimun hydroxide | | |
| Solvent | Cyclohexanone | |
| | Toluene | |
| Inorganic filler | Rock wool | Diameter: 5 μm, average fiber length: 3 mm |
| | Talc | Average particle size: 5,5 μm |
| | Calcium carbonate | Particle size: through 70 mesh |
| Blowing aid | Boric acid | |
| | CP | Urea-type composition |
| Stabilizer | TB | Tribasic lead sulfate |

TABLE 6

| | | | Components of foamable composition (parts by weight) | | | | | | | | | | |
| --- | --- | --- | --- | --- | --- | --- | --- | --- | --- | --- | --- | --- | --- |
| | | | | | Solvent | | | | Inorg substance | | | | Stabilizer (TB) |
| Ex. No. | PVC | Blowing agent (DPT) | Zn-cont. compd. | Al(OH)₃ | Cyclohexanone | Toluene | Max. tolque temp (°C.) | Max. torque (N m) | Rock wool | Talc | CaCO₃ | Blowing aid | |
| 19 | (100) | (30) | CZ(75) | (100) | (100) | (500) | 80 | 10.8 | (31) | (100) | (365) | Boric acid(20) | (6) |
| 20 | (100) | (30) | PZ(90) | (100) | (100) | (500) | 80 | 10.8 | (31) | (100) | (350) | Boric acid(20) | (6) |
| 21 | (100) | (30) | BZ(10) | (300) | (100) | (500) | 80 | 10.8 | (31) | (100) | (230) | Boric acid(20) | (6) |
| 22 | (100) | (30) | BZ(90) | (220) | (100) | (500) | 80 | 10.8 | (31) | (100) | (230) | Boric acid(20) | (6) |
| 23 | (100) | (28) | SZ(10) | (100) | (100) | (500) | 80 | 10.8 | (31) | (100) | (440) | CP(28) | (6) |
| 24 | (100) | (30) | SZ(20) | (150) | (100) | (500) | 80 | 10.8 | (31) | (100) | (390) | Boric acid(20) | (6) |
| 25 | (100) | (30) | OZ(10) | (100) | (100) | (500) | 80 | 10.8 | (31) | (100) | (440) | Boric acid(20) | (6) |
| 26 | (100) | (30) | MZ(10) | (100) | (100) | (500) | 80 | 10.8 | (31) | (100) | (440) | Boric acid(20) | (6) |
| 27 | (100) | (30) | BZ(95) | (15) | (100) | (500) | 80 | 10.8 | (31) | (100) | (430) | Boric acid(20) | (6) |
| 28 | (100) | (30) | BZ(5) | (570) | (100) | (500) | 80 | 10.8 | (31) | (100) | (0) | Boric acid(20) | (6) |
| 29 | (100) | (30) | BZ(95) | (0) | (100) | (500) | 80 | 10.8 | (31) | (100) | (445) | Boric acid(20) | (6) |
| Comp. Ex. | | | | | | | | | | | | | |
| 8 | (100) | (28) | — | (0) | (100) | (500) | 80 | 10.8 | (31) | (100) | (540) | Boric acid(28) | (6) |
| 9 | (100) | (28) | — | (270) | (100) | (500) | 80 | 10.8 | (31) | (100) | (270) | Boric acid(28) | (6) |

| | Properties of foam | | |
| --- | --- | --- | --- |
| Ex. No. | Apparent density (g/cm³) | Expansion ratio (times) | Temp.-time area (°C. min) |
| 19 | (0.115) | (102) | (0) |
| 20 | (0.106) | (111) | (11) |
| 21 | (0.100) | (117) | (0) |
| 22 | (0.125) | (94) | (0) |
| 23 | (0.109) | (108) | (0) |
| 24 | (0.104) | (115) | (9) |
| 25 | (0.100) | (119) | (1) |
| 26 | (0.110) | (108) | (74) |
| 27 | (0.115) | (102) | (0) |
| 28 | (0.119) | (98) | (0) |
| 29 | (0.105) | (112) | (50) |
| Comp. Ex. | | | |
| 8 | (0.130) | (94) | (256) |
| 9 | (0.125) | (94) | (118) |

As described above, a foamable composition of the invention presents an inexpensive foam which produces reduced heat generated on burning and is excellent in first safety. In addition, this rigid foam proves to be suitable for a thermal insulating material in construction and the like because of its reduced heat generated on burning and its thermal insulating function as a foam.

EXAMPLES 30 TO 33 AND COMPARATIVE EXAMPLE 10

PVC, rock wool, talc, a blowing agent, a stabilizer and a solvent which were listed on Table 1, aluminum hydroxide (average particle size 1 μm), calcium carbonate (average particle size 2 μm), and zinc borate (average particle size 6 μm) were weighed in the proportions shown in Table 7 to a total weight of 33 kg.

All raw materials other than the blowing agent were fed into a twin kneader of effective capacity of 20 l and kneaded together for 25 minutes, while controlling the kneading temperature of the mixture to 85° to 105° C. by passing hot water through the jacket of the kneader, to obtained a composition.

The temperature of the composition in the kneader was lowered down to about 70° C. by passing warm water through the jacket of the kneader, the blowing agent was added, and then the resultant composition was subsequently kneaded together for 10 minutes to obtain a foamable composition.

The obtained foamable composition was filled into an aluminum alloy mold of a cavity size of 710 mm×640 mm×23 mm, and the mold was covered with an aluminum plate and mounted on a hydraulic heat press machine, and then the temperature was raised from room temperature (about 10° C.) to 175° C. taking 20 minutes.

The clamping pressure of the press machine was about 200 kg per 1 cm² of the area of the mold in each Example.

After maintaining the mold at 175° C. for 15 minutes, the temperature of the mold was lowered down to 30° to 35° C., taking about 10 minutes, by passing warm water through the cooling plate of the press machine and the mold was kept at the same temperature for about 30 minutes.

When the press machine was released from the clamping pressure, the expansion of the content of the mold was completed in about one second.

While the foam obtained in Examples 30 and 31 had a good form similar to the form of the mold and a good appearance, the one obtained in Comparative Example 10 was good in appearance but somewhat thick at its edge sections. The foams were allowed to stand at 50° C. for about a half day, and further at 75° C. for about one day, in an aging chamber, to evaporate away the solvent, and finished to a size of 1000 mm×900 mm×30 mm. Using these finished foams, model box tests (Notice No. 1231 by the Ministry of Construction (Japan)), surface tests and test for harmfulness of gas (JIS A1321), and determinations of thermal conductivity (ASTM C518) and degree of carbonization were carried out. Results are shown in Table 7.

The expansion ratio and degree of carbonization in Table 7 were calculated in the same manner as those for Examples 1 to 5.

TABLE 7

|  |  | Ex. 30 | Ex. 31 | Ex. 32 | Ex. 33 | Comp. Ex. 10 |
| --- | --- | --- | --- | --- | --- | --- |
| Composition of material (part) | PSH-600 | 100 | 100 | 100 | 100 | 100 |
|  | Rock wool | 31 | 31 | 31 | 31 | 0 |
|  | Zinc borate | 0 | 0 | 270 | 0 | 0 |
|  | Al(OH)$_3$ | 270 | 220 | 0 | 0 | 270 |
|  | Talc | 100 | 100 | 100 | 100 | 100 |
|  | CaCO$_3$ | 270 | 320 | 270 | 540 | 270 |
|  | AIBN | 42.5 | 42.5 | 0 | 42.5 | 42.5 |
|  | DPT | 0 | 0 | 28 | 0 | 0 |
|  | SL | 6 | 6 | 0 | 6 | 6 |
|  | TB | 0 | 0 | 6 | 0 | 0 |
|  | Toluene | 525 | 525 | 525 | 525 | 525 |
|  | Cyclohexanone | 105 | 105 | 105 | 105 | 105 |
| Max. torque temp. of solvent (°C.) |  | 80 | 80 | 80 | 80 | 80 |
| Max. torque of solvent (N · m) |  | 10.8 | 10.8 | 10.8 | 10.8 | 10.8 |
| Properties of foam | Apparent dinsity (g/cm$^3$) | 0.127 | 0.113 | 0.172 | 0.121 | 0.107 |
|  | Expansion ratio (times) | 90 | 101 | 66 | 95 | 103 |
|  | Cell size (mm) | 1 to 2 | 1 to 2 | 1 to 2 | 1 to 2 | 1 to 2 |
|  | Thermal conductivity (Kcal/mh °C.) | 0.045 | 0.047 | — | 0.042 | — |
| Model box test | Max. exotherm. rate (KJ/s) | 107 | 117 | — | 145 | — |
|  | Total exotherm. heat (KJ) | 39,800 | 48,700 | — | 62,200 | — |
|  | Max. temp. in the box (°C.) | 467 | 557 | — | 662 | — |
|  | Destruction by fall | None | None | — | None | — |
|  | Result | Yes | Yes | — | No | — |
| Surface test | Smoking coefficient (CA) | 1.2 | 1.5 | 34 | 3.0 | 3.0 |
|  | Temp.-time area (°C. · min) | 0 | 9 | 0 | 41 | 42 |
|  | Cracks | None | None | None | None | Piercing cracks (3 mm-wide) |
|  | Dimension before test (mm) | 220 × 220 | 220 × 220 | 220 × 221 | 220 × 220 | 220 × 219 |
|  | Dimension after test (mm) | 220 × 220 | 220 × 219 | 217 × 217 | 216 × 216 | 218 × 218 |
|  | Results | Yes | Yes | Yes | Yes | No |
| Tests for harmfulness of gas | Motion-stopping time (min, mouse) | At least 15 | — | — | — | — |
|  | Results | Yes | — | — | — | — |
| Extent of carbonization |  | ◯ | ◯ | ◯ | ◯ | O |

EXAMPLE 34

A foam was obtained in the same manner as that for Examples 30 to 33 except that the raw materials, except talc, were weighed in the proportions shown in Table 8.

Although the obtained foam meets the quasi-noncombustive standard, its cell size is rather large (3 to 5 mm).

TABLE 8

| Material (parts) |  |
| --- | --- |
| PSH-660 | 100 |
| Rock wool | 31 |

TABLE 8-continued

| Talc | 0 |
|---|---|
| Al(OH)$_3$ | 320 |
| CaCO$_3$ | 320 |
| AIBN | 42.5 |
| SL | 6 |
| Toluene | 525 |
| Cyclohexanone | 105 |
| Max. torque temp. of solvent (°C.) | 80 |
| Max. torque of solvent (N · m) | 10.8 |
| Properties of foam | |
| Apparent density (g/cm$^3$) | 0.111 |
| Expansion ratio (times) | 103 |
| Cell size (mm) | 3 to 5 |

These results prove that a foam of the invention containing rock wool which is not injurious to human safety and health generates small amounts of heat, smoke and deformation on burning, is difficult to collapse on burning, due to its large residual strength after burning, is very good is fire safety, is excellent in thermal insulating performance, and that the foam obtained in Examples 30, 31, 32 and 34 meets the requirements of the model box test, the surface test, and the test for harmfulness of gas, and can be suitably used as a quasi-noncombustive, thermal insulating material for construction uses, and the like.

EXAMPLES 35 TO 52 AND COMPARATIVE EXAMPLES 11 TO 14

First, 100 parts of PVC (PSH-660), 30 parts of rock wool, 100 parts of talc, 270 parts of calcium carbonate, 270 parts of aluminum hydroxide, 6 parts of dibasic lead stearate, and 630 parts of solvent, which are listed on Table 9, were mixed and weighed to a total weight of 5000 g.

All raw materials, other than the blowing agent, were fed into a twin kneader of effective capacity of 3 l, and kneaded together for 30 minutes while controlling the kneading temperature 80° to 100° C. by passing hot water through the jacket of the kneader to obtain a composition.

The temperature of the composition in the kneader was lowered down to about 60° C. by passing warm water through the jacket of the kneader, a blowing agent (AIBN) was added, and then the thus formed composition was subsequently kneaded together for 10 minutes to obtain a foamable composition.

The obtained foamable composition was filled into an aluminum alloy mold of cavity size of 160 mm × 160 mm × 22 mm, and the mold was covered with an aluminum plate and mounted in a hydraulic heat press machine, and then the temperature was raised from room temperature (about 20° C.) to 165° C. taking 10 minutes.

The clamping pressure of the press machine was about 150 kg per 1 cm$^2$ of the area of the mold in each Example.

Then, after maintaining the mold at 165° C. for 10 minutes, the temperature of the mold was lowered down to 30° C. to 35° C., taking about 10 minutes, by passing warm water through the cooling plate of the press machine, and the mold was kept at the same temperature for about 15 minutes.

When the press machine was released from the clamping pressure, the expansion of the content of the mold was completed in about one second.

Obtained foams always had a good appearance and also had good cell uniformity on cutting planes.

The foam was placed in a hot air circulating oven, and was allowed to stand at 55° C. for about a half day, and further at 80° C. for about one day, to evaporate away the solvent.

Then the apparent density, expansion ratio and degree of carbonization of the foam were determined by the same procedures as those for Examples 1 to 5. The coefficient of shrinkage after expansion was evaluated according to the following method. Results are shown in Table 9. (Coefficient of shrinkage after expansion)

The volume (VA) of the foam immediately after expansion, and the volume (VB) of the foam after evaporating away the solvent therefrom, were determined by measuring the length of the foam with a pair of slide calipers or a tape measure.

The coefficient of shrinkage after expansion was calculated according to the following equation:

[Coefficient of shrinkage after expansion] = $(1 - VB/VA) \times 100 (\%)$

In Tables 9 and 10, TOL means toluene, CH means cyclohexanone, ACE means acetone, DIBK means diisobutylketone, MEK means methylethylketone, CP means cyclopentanone, MIBK means methylisobutylketone, MO means mesityl oxide, DMF means dimethylformamide, MC means methyl cellosolve, BA means n-butyl acetate, THF means tetrahydrofuran, BC means butyl cellosolve, and XY means xylene.

TABLE 9

| Ex. No. | Solvent Component (weight ratio) | Max. torque temp. (°C.) | Max. torque (N m) | Properties of foam Coef. of shrinkage after expansion (%) | Apparent density (g/cm$^3$) | Expansion ratio (times) | Degree of carbonization |
|---|---|---|---|---|---|---|---|
| 35 | TOL/CH = 5/1 | 80 | 10.8 | 17 | 0.100 | 115 | ○ |
| 36 | TOL/CH = 14/1 | 98 | 6.8 | 35 | 0.160 | 71 | ○ |
| 37 | TOL/ACE = 5/1 | 78 | 9.7 | 29 | 0.126 | 91 | ○ |
| 38 | TOL/DIBK = 5/1 | 101 | 4.1 | 31 | 0.191 | 60 | ○ |
| 39 | TOL/MEK = 5/1 | 87 | 5.1 | 34 | 0.158 | 73 | ○ |
| 40 | TOL/CP = 5/1 | 80 | 6.8 | 28 | 0.124 | 92 | ○ |
| 41 | TOL/MIBK = 5/1 | 76 | 5.3 | 31 | 0.185 | 62 | ○ |
| 42 | TOL/MO = 5/1 | 88 | 5.8 | 27 | 0.139 | 82 | ○ |
| 43 | TOL/DMF = 9/1 | 76 | 6.1 | 13 | 0.108 | 106 | ○ |
| 44 | TOL/CH = 9/1 | 87 | 5.7 | 27 | 0.177 | 79 | ○ |
| 45 | TOL/CH = 3/1 | 70 | 9.3 | 7 | 0.111 | 103 | ○ |
| 46 | TOL/ACE = 9/1 | 85 | 5.4 | 36 | 0.132 | 87 | ○ |
| 47 | TOL/ACE = 3/1 | 49 | 6.9 | 35 | 0.174 | 66 | ○ |
| 48 | BA/CH = 5/1 | 82 | 9.4 | 19 | 0.124 | 93 | ○ |
| 49 | MC/CH = 5/1 | 114 | 6.9 | 35 | 0.184 | 62 | ○ |
| 50 | TOL/THF = 9/1 | 93 | 4.0 | 36 | 0.190 | 60 | ○ |
| 51 | CH/BC = 1/1 | 114 | 9.5 | 11 | 0.143 | 98 | ○ |
| 52 | CH/BC = 1/2 | 130 | 9.0 | 25 | 0.199 | 58 | ○ |

TABLE 9-continued

| Ex No | Solvent Component (weight ratio) | Max. torque temp. (°C.) | Max. torque (N m) | Coef. of shrinkage after expansion (%) | Apparent density (g/cm³) | Expansion ratio(times) | Degree of carbonization |
|---|---|---|---|---|---|---|---|
| Comp. 11 | TOL only | 104 | 3.8 | 53 | 0.336 | 34 | ○ |
| Comp. 12 | CH only | 44 | 39.0 | — | — | — | — |
| Comp. 13 | CH/MC = 1/1 | 63 | 29.5 | — | — | — | — |
| Comp. 14 | XY only | 124 | 3.4 | 45 | 0.336 | 34 | ○ |

(Note) In Comparative Examples 12 and 13, cells were broken because of poor strength of cell membrane.

COMPARATIVE EXAMPLES 15 TO 23

A foam was obtained in the same manner as that set forth in Examples 35 to 52 except that chlorinated polyvinyl chloride (CPVC, average polymerization degree 2500, chlorine content 67%) was used instead of PVC, and bis (di-n-butyltin monolaurate) maleate was used instead of dibasic lead stearate.

The apparent density, expansion ratio, coefficient of shrinkage after expansion, and degree of carbonization, as properties of the obtained foam, were determined in the same manner as those for Examples 35 to 52. Results are shown in Table 10.

The maximum torque temperature and the maximum torque of the composition containing the solvent herein are those observed when CPVC (average polymerization degree 2500, chlorine content 67%) is used instead of PVC (average polymerization degree 2400).

According to these results, the use of a specific solvent appropriate to the expansion of PVC tends to make it difficult to obtain a good foam and tends to reduce the expansion ratio. In addition, the phenomenon of turning to ash takes place, wherefore such a foam itself cannot be used as a quasi-noncombustive or noncombustive material.

TABLE 10

| Comp. Ex. No. | Solvent Component (weight ratio) | Max. torque temp. (°C.) | Max. torque (N m) | Coef. of shrinkage after expansion (%) | Apparent density (g/cm³) | Expansion ratio (times) | Degree of carbonization |
|---|---|---|---|---|---|---|---|
| 15 | TOL only | 71 | 12.7 | Severe breakage of cells | — | — | — |
| 16 | TOL/CH = 5/1 | 58 | 13.3 | No foam obtained | — | — | — |
| 17 | TOL/ACE = 5/1 | 56 | 15.8 | 47 | 0.411 | 32 | X |
| 18 | TOL/DIBK = 5/1 | 50 | 15.7 | 40 | 0.392 | 33 | X |
| 19 | TOL/MEK = 5/1 | 59 | 15.2 | 38 | 0.195 | 67 | X |
| 20 | TOL/CP = 5/1 | 60 | 16.0 | 37 | 0.419 | 31 | X |
| 21 | TOL/MIBK = 5/1 | 65 | 13.9 | 42 | 0.199 | 66 | X |
| 22 | TOL/MO = 5/1 | 65 | 13.2 | 31 | 0.215 | 61 | X |
| 23 | CH only | 61 | 14.8 | Severe breakage of cells | — | — | — |

These results prove that the rigid foam of the invention has a small coefficient of shrinkage after expansion, that an expansion ratio higher than 50 times is necessary to produce a quasi-noncombustive foam, and that this foam does not turn to ash on burning.

EXAMPLE 53 to 55

A foam was obtained in the same manner as that set forth in Examples 1 to 5 except that the raw materials shown in Table 11 were used.

The apparent density, expansion ratio and degree of carbonization, as properties of the obtained foam, were determined in the same manner as those for Examples 1 to 5. The maximum temperature that the substrate material could withstand in an oven was determined according to JIS A1321.1. Results are shown in Table 11.

The fact that the maximum temperature is not more than 800° C. here means that the foam can be used as a noncombustive foam.

TABLE 11

| | Components of composition (parts by weight) | | | | | | | | |
|---|---|---|---|---|---|---|---|---|---|
| | | Inorg. substance | | | Solvent | | | | |
| Ex. No. | PVC | Rock wool | Al(OH)₃ | Talc | Kind | Max. torque temp. (°C.) | Max. torque (N m) | Blowing agent | Stabilizer |
| 53 | PSH-660 (100) | (2) | (800) | (100) | Toluene(458)/ Cyclohexanone(92) | 80 | 10.8 | AIBN (42.5) | SL (6) |
| 54 | PSH-660 (100) | (2) | (1000) | (50) | Toluene(458)/ Cyclohexanone(92) | 80 | 10.8 | AIBN (42.5) | SL (6) |
| 55 | PSH-660 (100) | (2) | (1100) | (50) | Toluene(458)/ Cyclohexanone(92) | 80 | 10.8 | AIBN (42.5) | SL (6) |

| Ex. No. | Kneading temp. (°C.) | Blowing temp. (°C.) | Apparent density (g/cm³) | Expansion ratio (times) | Max. temp. in oven (°C.) | Degree of carbonization |
|---|---|---|---|---|---|---|
| 53 | 91 | 32 | 0.128 | 115 | 805 | ○ |
| 54 | 88 | 31 | 0.176 | 95 | 796 | ○ |
| 55 | 88 | 30 | 0.190 | 96 | 795 | ○ |

These results prove that the rigid foams obtained in Examples 54 and 55 have a noncombustive property and can be suitably used as a noncombustive building material and the like.

INDUSTRIAL APPLICABILITY

A rigid foam made of the foamable composition of the invention is excellent in human safety and health since it does not contain asbestos. It is small in amounts of generated heat, smoke, generated noxious gas, and deformation on burning. It is excellent in dimensional stability and thermal resistance when used at high temperatures, and does not collapse into ashes even on forced burning. In addition, it is inexpensive. Due to these advantages, it can be suitably used as a heat insulating building material and the like.

We claim:

1. A foamable composition which consists essentially of (A) a vinyl chloride resin, (B) an inorganic substance comprising inorganic fibers of not less than 1 μm diameter, (C) a mixed solvent having properties such that when a mixture, which is composed of 100 parts by weight of a vinyl chloride resin of average polymerization degree of 2400, 100 parts by weight of said solvent, and 6 parts by weight of dibasic lead stearate is kneaded using a plastograph at 30 rpm while raising the temperature, the maximum torque on said kneader is 4 to 25 N.m and (D) a decomposition-type blowing agent, wherein said composition is formed by kneading at a temperature not less than that at which said vinyl chloride resin and said solvent become compatible with each other, and not more than the boiling point of said solvent.

2. The foamable composition of claim 1, wherein the temperature at which said maximum torque is achieved is 40° to 150° C.

3. The foamable composition of claim 1, wherein the average polymerization degree of said vinyl chloride resin is 1500 to 5000.

4. The foamable composition of claim 1, wherein said inorganic fibers are rock wool.

5. The foamable composition of claim 1, wherein said inorganic fibers are glass fiber.

6. The foamable composition of claim 1, wherein said inorganic substance contains a metal hydroxide.

7. The foamable composition of claim 6, wherein said metal hydroxide is aluminum hydroxide.

8. The foamable composition of claim 7, wherein the amount of aluminum hydroxide used is not less than 80 parts by weight per 100 parts by weight of the vinyl chloride resin.

9. The foamable composition of claim 7, wherein the amount of aluminum hydroxide used is not less than 900 parts by weight per 100 parts by weight of the vinyl chloride resin.

10. The foamable composition of claim 1, wherein said inorganic substance contains a nucleating agent.

11. The foamable composition of claim 10, wherein said nucleating agent is talc.

12. The foamable composition of claim 1, wherein the amount of said inorganic fibers is 2 to 200 parts by weight per 100 parts by weight of the vinyl chloride resin.

13. The foamable composition of claim 1, wherein the amount of said inorganic substance used is 200 to 2000 parts by weight per 100 parts by weight of the vinyl chloride resin.

14. The foamable composition of claim 1, wherein the amount of said solvent used is 250 to 3000 parts by weight per 100 parts by weight of the vinyl chloride resin.

15. The foamable composition of claim 1, wherein said decomposition-type blowing agent is one which generates nitrogen gas by thermal decomposition.

16. The foamable composition of claim 1, wherein said decomposition-type blowing agent is dinitrosopentamethylenetetramine.

17. The foamable composition of claim 16, wherein said composition contains a zinc-containing compound.

18. The foamable composition of claim 17, wherein the amount of said zinc-containing compound used is 5 to 95 parts by weight per 100 parts by weight of the vinyl chloride resin.

19. The foamable composition of claim 1, wherein said composition contains a stabilizer.

20. The foamable composition of claim 1, wherein said vinyl chloride resin is vinyl chloride homopolymer.

21. The foamable composition of claim 1, wherein said vinyl chloride resin is a mixture comprising vinyl chloride homopolymer.

22. A process for preparing a foamable composition comprising forming a composition comprising (A) a vinyl chloride resin, (B) an inorganic substance comprising inorganic fibers of not less than 1 μm diameter, (C) a solvent, which when mixed in a composition composed of 100 parts by weight of a vinyl chloride resin of average polymerization degree of 2400, 100 parts by weight of said solvent, and 6 parts by weight of dibasic lead stearate, and the composition is kneaded using a plastograph at 30 rpm while raising the temperature, exhibits a maximum torque of 4 to 25 N.m, and (D) a decomposition-type blowing agent; and kneading said composition with heating to a temperature not less than that which said vinyl chloride resin and said solvent become compatible with each other and form a homogeneous gel phase, and not more than the boiling point of said solvent.

23. A process for preparing a foamable composition comprising forming a mixture of (A) a vinyl chloride resin, (B) an inorganic substance comprising inorganic fibers of not less than 1 μm diameter, (C) a solvent, which when mixed into a composition composed of 100 parts by weight of a vinyl chloride resin of average polymerization degree of 2400, 100 parts by weight of said solvent, and 6 parts by weight of dibasic lead stearate, and the mixture is kneaded, using a plastograph with heating to a temperature not less than that at which said vinyl chloride resin and said solvent become compatible with each other and form a homogeneous gel phase and not more than the boiling point of said solvent, it exhibits a maximum torque on said kneading of 4 to 25 N.m; kneading said mixture; adding (D) a decomposition-type blowing agent to the mixture at a temperature lower than the decomposing point of the decomposition-type blowing agent; and further kneading the resulting mixture.

24. A foamed article having an expansion ratio of not less than 50 times which is prepared from a foamable composition consisting essentially of (A) a vinyl chloride resin, (B) an inorganic substance comprising inorganic fibers of not less than 1 μdiameter, (C) a mixed solvent having properties such that when a mixture, which is composed of 100 parts by weight of a vinyl chloride resin of average polymerization degree of 2400, 100 parts by weight of said solvent, and 6 parts by weight of dibasic lead stearate is kneaded using a plastograph at 30 rpm while raising the temperature, the maximum torque on said kneader is 4 to 25 N.m and (D) a decomposition-type blowing agent, wherein said composition is formed by kneading at a temperature not less than that at which said vinyl chloride resin and said solvent become compatible with each other, and not more than the boiling point of said solvent.

25. A process for preparing a rigid, foamed article, comprising forming a foamable composition as claimed in claim 1 at elevated temperature and pressure; filling the resulting composition into a closable mold; closing said mold and heating the composition therein under pressure sufficient to decompose said decomposition-type blowing agent; and then expanding said composition by adjusting said temperature to an expansion temperature and opening the mold.

26. The foamable composition of claim 1, wherein the amount of said solvent used is 350–3,000 parts by weight per 100 parts by weight of the vinyl chloride resin.

* * * * *